United States Patent
Bell et al.

(10) Patent No.: US 9,464,901 B1
(45) Date of Patent: Oct. 11, 2016

(54) RNP-SCALED WAYPOINT SYMBOLOGY GENERATING SYSTEM, DEVICE, AND METHOD

(71) Applicants: Douglas A. Bell, Marion, IA (US); Sarah Barber, Cedar Rapids, IA (US); James H. Doty, Cedar Rapids, IA (US)

(72) Inventors: Douglas A. Bell, Marion, IA (US); Sarah Barber, Cedar Rapids, IA (US); James H. Doty, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/723,518

(22) Filed: May 28, 2015

(51) Int. Cl.
G01C 21/00 (2006.01)
G06T 11/20 (2006.01)
G06T 3/40 (2006.01)

(52) U.S. Cl.
CPC ........... *G01C 21/00* (2013.01); *G06T 3/40* (2013.01); *G06T 11/20* (2013.01); *G06T 2200/04* (2013.01); *G06T 2200/28* (2013.01)

(58) Field of Classification Search
CPC ......... G01C 21/00; G06T 3/40; G06T 11/20; G06T 2200/28; G06T 2200/04
See application file for complete search history.

(56) References Cited

U.S. PATENT DOCUMENTS

| | | | | |
|---|---|---|---|---|
| 6,240,341 B1 * | 5/2001 | Snyder | | G01C 23/00 345/530 |
| 6,317,059 B1 * | 11/2001 | Purpus | | G01C 23/005 340/973 |
| 6,381,519 B1 * | 4/2002 | Snyder | | G01C 23/00 244/175 |
| 6,389,355 B1 * | 5/2002 | Gibbs | | G08G 5/0021 434/38 |
| 6,449,556 B1 * | 9/2002 | Pauly | | G01C 23/00 701/120 |
| 6,486,799 B1 * | 11/2002 | Still | | G01C 23/005 340/961 |
| 6,664,989 B1 * | 12/2003 | Snyder | | G06F 3/04812 715/856 |
| 6,707,475 B1 * | 3/2004 | Snyder | | B64D 43/00 345/902 |
| 6,980,198 B1 * | 12/2005 | Gyde | | B64D 43/00 345/157 |
| 7,782,229 B1 * | 8/2010 | Barber | | G01C 23/005 340/945 |
| 7,965,202 B1 * | 6/2011 | Chiew | | G01C 23/00 340/973 |
| 2009/0248297 A1 * | 10/2009 | Feyersisen | | G01C 21/00 701/467 |
| 2009/0315739 A1 * | 12/2009 | Raje | | G01C 23/00 340/979 |
| 2009/0319098 A1 * | 12/2009 | Raje | | G01C 23/00 701/3 |

(Continued)

OTHER PUBLICATIONS

U.S. Terminal and En Route Area Navigation (RNAV) Operations, pp. 1-17, AC No. 90-100A, Mar. 1, 2007, Department of Transportation, Federal Aviation Administration.

(Continued)

*Primary Examiner* — Rodney Butler
*Assistant Examiner* — Frederick Brushaber
(74) *Attorney, Agent, or Firm* — Daniel M. Barbieri; Donna P. Suchy; Angel N. Gerdzhikov

(57) ABSTRACT

A system, device, and method for generating an RNP-scaled waypoint symbology presentable to a pilot are disclosed. The symbology generating system may include a source of source of navigation data, a symbology generator (SG), and a presentation system. The SG may be configured to acquire navigation data representative of one or more distance measurements of an area navigation system or a required navigation performance system; and generate presentation data as a function of each distance measurement. The presentation data could be representative of waypoint symbology presentable to a viewer. In some embodiments, the waypoint symbology may be comprised of a two-dimensional object or a three-dimensional object having a plurality of shapes centered on a reference line, where a size of a first shape may be scaled to a first distance measurement, and a size of a second shape may be scaled to a second distance measurement.

20 Claims, 6 Drawing Sheets

(56) References Cited

U.S. PATENT DOCUMENTS

| | | | | |
|---|---|---|---|---|
| 2010/0023187 A1* | 1/2010 | Gannon | ............... | G01C 23/00 701/7 |
| 2010/0131126 A1* | 5/2010 | He | ............... | G01C 21/00 701/14 |
| 2010/0309222 A1* | 12/2010 | Feyereisen | ............... | G01C 21/00 345/629 |
| 2012/0026190 A1* | 2/2012 | He | ............... | G01C 21/00 345/633 |
| 2014/0222257 A1* | 8/2014 | Wyatt | ............... | G08G 5/0021 701/16 |

OTHER PUBLICATIONS

Approval Guidance for RNP Procedures with AR, pp. 1-5, AC No. 90-101A, Feb. 23, 2011, Department of Transportation, Federal Aviation Administration.

Minimum Aviation System Performance Standards: Required Navigation Performance for Area Navigation, DO-236B, Oct. 28, 2003, RTCA, Inc.

Criteria for Approval of Category I and Category II Weather Minima for Approach, AC 120-29A, Aug. 12, 2002, Department of Transportation, Federal Aviation Administration.

* cited by examiner

RNP-SCALED WAYPOINT SYMBOLOGY GENERATING SYSTEM, DEVICE, AND METHOD

BACKGROUND

1. Field of the Inventive Concepts

The inventive concepts disclosed herein pertain generally to the field of aircraft display units that present information to the pilot of an aircraft.

2. Description of the Related Art

The continuing growth of aviation has placed increasing demands on airspace capacity and emphasizes the need for the best use of the available airspace. These factors, along with the accuracy of modern aviation navigation systems and the requirement for increased operational efficiency in terms of direct routings and track-keeping accuracy, have resulted in the concept of "Required Navigation Performance" ("RNP") standards—statements of the navigation performance accuracy necessary for operation within a defined airspace. Some of these standards appear in an Advisory Circular ("AC") published by the Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation," each of which is incorporated herein in its entirety. Other RNAV-related publications include AC 90-100A entitled "U.S. Terminal and En Route Area Navigation (RNAV) Operations" and AC 90-101A entitled "Approval Guidance for RNP Procedures with AR," each of which is incorporated herein in its entirety.

Aircraft area navigation (RNAV) and required navigation performance (RNP) systems installed in aircraft may be designed to performance-based specifications that are defined in terms of quality factors such as accuracy, integrity, availability, continuity, and functionality. RNAV and RNP systems may allow an aircraft to fly a specific flight track between two waypoints, where each waypoint may be a defined as a three-dimensional point above or on the ground; the former could be a position defined by a latitude, longitude, and altitude, and the latter could be a surveyed position measured by latitude, longitude, and elevation such as, for example, the locations of a ground-based navigational aid, a landing threshold point, and/or a glide path intercept point.

In the past, the navigational capabilities of an aircraft were defined relative to ground-based navigation aids such as, for example, a Very High Frequency Omni-Directional Range (VOR) station or a Non-Directional Radio Beacon (NDB) station; however, with RNP, an airplane's navigational capability may be defined in terms of the performance and integrity of equipment installed onboard an aircraft. As such, a number of navigation solutions may be generated by the equipment such as a global navigation satellite system (or satellite navigation system including global positioning system (GPS)) and ground-based navigation aids employing Distance Measuring Equipment such as DME/DME, and/or VOR/DME. Each of these provides an aircraft with a certain degree of navigational precision/navigational capability. The higher the degree of navigational capability/performance, the more precisely the aircraft may be able to follow a pre-determined flight path, thereby reducing the separation between some routes and increasing airspace utilization. Also, improved navigational capability may allow a pilot of an aircraft to approach an airport in mountainous terrain that would otherwise not be permitted.

Measurements corresponding to RNP include estimated position uncertainty (EPU) and flight technical error (FTE). The former may be a value calculated by an aircraft's source of navigation data such as a flight management system (FMS) to indicate a level of quality of the aircraft's actual position, and the latter may be a degree of precision with which an aircraft may be flown either manually or on autopilot along a desired flight path. Two types of routes that RNP-capable aircraft may utilize include RNAV routes and RNP routes.

For RNAV routes, there may be a requirement that an aircraft's total system error (TSE) be within an RNAV boundary equal to one times the RNP value ninety-five percent of the time, where TSE is equal to the sum of EPU and FTE. For instance, for an RNAV 2.0 route (i.e., route required to have an RNAV performance is 2.0 Nautical Miles (nm), the pilot would be allowed an FTE of 1.5 nm if the EPU is calculated to be 0.5 NM. Having knowledge of the FTE available or allowable may enhance a pilot's ability to maintain the required navigational track within RNAV boundaries.

For RNP routes, there may be a requirement that an aircraft be flown within an RNP boundary equal to one times the RNP value ninety-five percent of the time. Another requirement includes the monitoring and alerting corresponding to a probability of failure to detect TSE larger than a second RNP boundary equal to two times the RNP value is no greater than 10E-5. For example, for an RNP 0.1 approach procedure, an aircraft will have to be flown within an RNP boundary of 607 feet (one times the RNP value of 0.1 nm) ninety-five percent of the time and equipped with monitoring and alerting corresponding to a second RNP boundary of 1,214 feet (two times the RNP value of 0.1 nm).

The flight path of RNAV and RNP routes may be comprised of a plurality of waypoints that are presentable in an image to the pilot. For example, waypoints may be depicted as three-dimensional objects as disclosed by Chiew et al in U.S. Pat. No. 7,965,202 entitled "System, System, [sic] Module, and Method for Presenting an Abbreviated Pathway on an Aircraft Display Unit," which is hereby incorporated by reference in its entirety. Also, a deviation from an RNAV path and RNP path may be depicted as a course deviation indicator as disclosed by Barber in U.S. Pat. No. 7,782,229 entitled "Required Navigation Performance (RNP) Scales for Indicating Permissible Flight Technical Error (FTE)," a reference hereby incorporated by reference in its entirety.

SUMMARY

The embodiments disclosed herein are directed to a system, device, and method for generating waypoint symbology presentable to a pilot. The waypoint symbology could be used to enhance situational awareness of a pilot by informing him or her of the presence of absence of allowable FTE.

In one aspect, embodiments of the inventive concepts disclosed herein are directed to a system for generating waypoint symbology. The system may include a source of source of navigation data, a symbology generator (SG), and a presentation system. In some embodiments, the presentation system may include a visual display unit, an aural advisory unit, and/or a tactile advisory unit.

In another aspect, embodiments of the inventive concepts disclosed herein are directed to a device for generating waypoint symbology. The device may include the SG and may be configured (or programmed) to perform a method of generating waypoint symbology presentable to a viewer.

In a further aspect, embodiments of the inventive concepts disclosed herein are directed to a method for generating waypoint symbology. When properly configured, the SG may acquire navigation data representative of one or more distance measurements of an area navigation system or a required navigation performance system and generate presentation data as a function of each distance measurement. The presentation data could be representative of waypoint symbology presentable to a viewer. In some embodiments, the waypoint symbology may be comprised of a two-dimensional object or a three-dimensional object having a plurality of shapes centered on a reference line, where a size of a first shape may be scaled to a first distance measurement, and a size of a second shape may be scaled to a second distance measurement.

DETAILED DESCRIPTION

In the following description, several specific details are presented to provide a thorough understanding of embodiments of the inventive concepts disclosed herein. One skilled in the relevant art will recognize, however, that the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1:
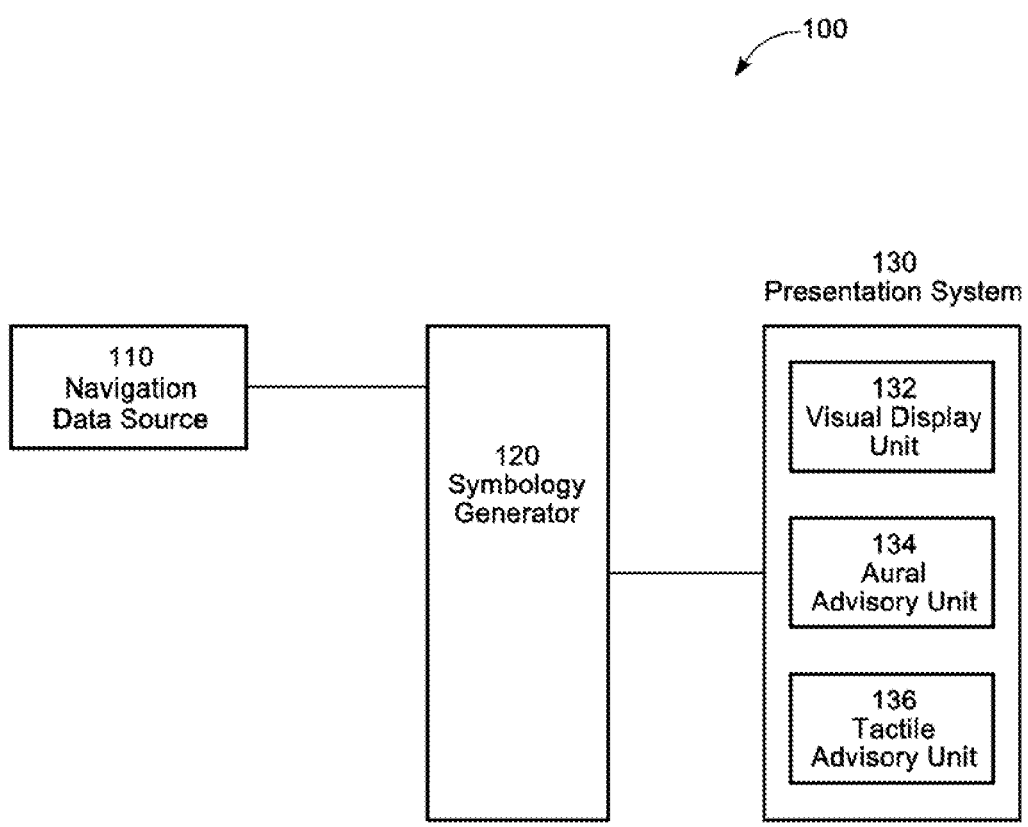
FIG. 1 depicts a functional block diagram of an embodiment of a system for generating waypoint symbology.

FIG. 1 depicts a functional block diagram of an embodiment of a waypoint symbology generating system 100 suitable for implementation of the techniques described herein. The functional blocks of the system 100 include a navigation data source 110, a symbology generator (SG) 120, and a presentation system 130.

The navigation data source 110 could include any source(s) which provides navigation data information in an aircraft. The navigation data source 110 may include, but is not limited to, an air/data system, an attitude heading reference system, an inertial guidance system (or inertial reference system), and a global navigation satellite system (or satellite navigation system), all of which are known to those skilled in the art. The navigation data source 110 could provide navigation data including, but not limited to, geographic position, altitude, heading, attitude, ground speed, air speed, and/or time. Aircraft position may be comprised of geographic position (e.g., latitude and longitude coordinates) and altitude, and ground track may be derived from either geographic position, aircraft position, or both.

The navigation data source 110 could further include a flight management system (FMS) which could perform a variety of functions to help the crew in the management of the flight. These functions could include receiving a flight plan (i.e., planned trajectory) and constructing a lateral and vertical flight plan (i.e., planned lateral and vertical trajectories) from the flight plan. The flight plan could be comprised of a series of waypoints, where each waypoint could include an altitude constraint associated with it. A pilot could create a flight plan by entering waypoints stored in a database or select a flight plan stored in a database of the FMS. In some embodiments, a self-defined waypoint such as a "virtual" waypoint could be created where one is not known or defined by an aviation-governing authority and/or does not currently exist, but may be created by a manufacturer and/or end-user; an example of a virtual waypoint is discussed by Wyatt et al in a U.S. Patent Application Publication No. 2014/0222257 entitled "Method and Apparatus for Generating a Virtual Inner Marker for an Aircraft Landing System." In some embodiments, the flight plan could be received and loaded into the FMS automatically through a data link system.

In the performance of its many functions, the FMS could compute a variety of distance measurements corresponding to an area navigation (RNAV) system and/or a required navigation performance (RNP) system. Further, distances and/or lengths could be computed by the pilot and entered into the FMS in some embodiments. The FMS may perform a variety of functions to help the crew in the management of the flight. In the performance of its many functions, the FMS may receive navigation data from the navigation data source 110 such as those discussed above.

It should be noted that, in some embodiments for any source or system in an aircraft including the navigation data source 110, data could be comprised of any analog or digital signal, either discrete or continuous, which could contain information or be indicative of information. In some embodiments, aircraft could mean any vehicle which is able to fly through the air or atmosphere including, but not limited to, lighter than air vehicles and heavier than air vehicles, wherein the latter may include manned or unmanned fixed-wing and rotary-wing vehicles.

The SG 120 could include any electronic data processing unit which executes software or computer instruction code that could be stored, permanently or temporarily, in a digital memory storage device or a non-transitory computer-readable media including, but not limited to, random access memory (RAM), read-only memory (ROM), compact disc (CD), hard disk drive, diskette, solid-state memory, Personal Computer Memory Card International Association card (PC-MCIA card), secure digital cards, and compact flash cards. The SG 120 may be driven by the execution of software or computer instruction code containing algorithms developed for the specific functions embodied herein. The SG 120 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "processor" is not limited to such processing units and its meaning is not intended to be construed narrowly. For instance, the SG 120 could also consist of more than one electronic data processing unit. In some embodiments, the SG 120 could be a processor(s) used by or in conjunction with any other system of the aircraft including, but not limited to, the navigation data source 110 and the presentation system 130.

In some embodiments, the terms "programmed" and "configured" are synonymous. The SG 120 may be electronically coupled to systems and/or sources to facilitate the receipt of input data. In some embodiments, operatively coupled may be considered as interchangeable with electronically coupled. It is not necessary that a direct connection be made; instead, such receipt of input data and the providing of output data could be provided through a data bus, through a wireless network, or as a signal received and/or transmitted by the SG 120 via a physical or a virtual computer port. The SG 120 may be programmed or configured to execute the method discussed in detail below. The SG 120 may be programmed or configured to provide output data to various systems and/or units including, but not limited to, the presentation system 130.

The presentation system 130 could be comprised of any unit of which visual, aural, and/or tactile indications may be presented to the pilot including, but not limited to, a visual display unit(s) 132, an aural advisory unit 134, and/or a tactile advisory unit 136. The visual display unit 132 could be comprised of any unit of which information may be presented visually to the pilot. The visual display unit 132 could be part of an Electronic Flight Information System (EFIS) and could be comprised of, but is not limited to, a Primary Flight Display (PFD), Navigation Display (ND), Head-Up Display (HUD), Head-Down Display (HDD), Multi-Purpose Control Display Unit, Engine Indicating and Crew Alerting System, Electronic Centralized Aircraft Monitor, Multi-Function Display, Side Displays, Electronic Flight Bags, Portable Electronic Devices (e.g., laptops, smartphones, tablets, and/or user-wearable devices such as head mounted devices).

The visual display unit 132 could be capable of projecting and/or presenting one or more waypoint symbologies. Waypoint symbologies may be presented graphically as disclosed below. Waypoints may include alerts and/or non-alert(s). Alerts may be based on level of threat or conditions requiring immediate crew awareness or attention. Caution alerts may be alerts requiring immediate crew awareness in which subsequent corrective action will normally be necessary. Warning alerts may be alerts requiring immediate crew action. In some embodiments, both caution and warning alerts may be presented in combination with or simultaneous to aural advisories and/or tactile advisories. Non-alerts may be any other information not requiring immediate crew attention or awareness. Alerts may be presented visually by depicting one or more colors and may be presented on a display unit indicating one or more levels of threat. For the purpose of illustration and not limitation, amber or yellow may indicate a caution alert, red may indicate a warning alert, and green or cyan may indicate a non-alert.

The aural advisory unit 134 may be any unit capable of producing aural advisories. Aural advisories may be discrete sounds, tones, and/or verbal statements used to annunciate a condition, situation, or event. Examples of aural advisories are provided below. In some embodiments, both aural advisories could be presented in combination with or simultaneous to visual alerts and/or tactile advisories.

The tactile advisory unit 136 may be any unit capable of producing tactile advisories. Tactile advisories may be any tactile stimulus to present a condition, situation, or event to the pilot such as, but not limited to, a warning alert and/or a caution alert. Examples of tactile stimuli include a "stick shaker" and a vibrating seat (e.g., a pilot's seat outfitted with a vibrating device). Moreover, tactile advisories could be presented in combination with or simultaneous to visual alerts and/or aural advisories. In some embodiments, one or more units of the presentation system 130 may receive presentation data provided by SG 120.

The visual display unit 132 may be configured to present one or more display(s) or image(s). In some embodiments, the terms "display" and "image" are interchangeable and treated synonymously.

Figure 2A:
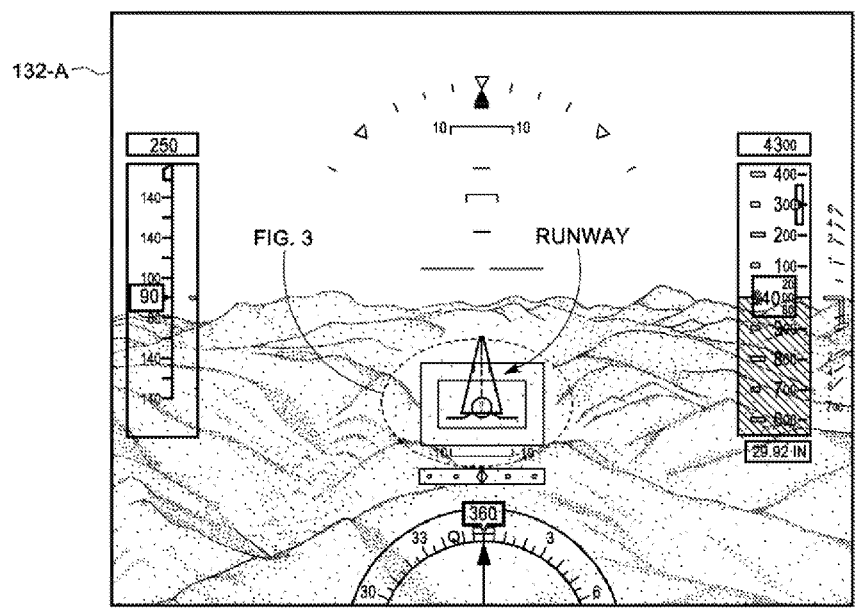
FIG. 2A presents an exemplary illustration of waypoint and flight path vector symbologies presented on a Head-Down Display unit.
Figure 2B:
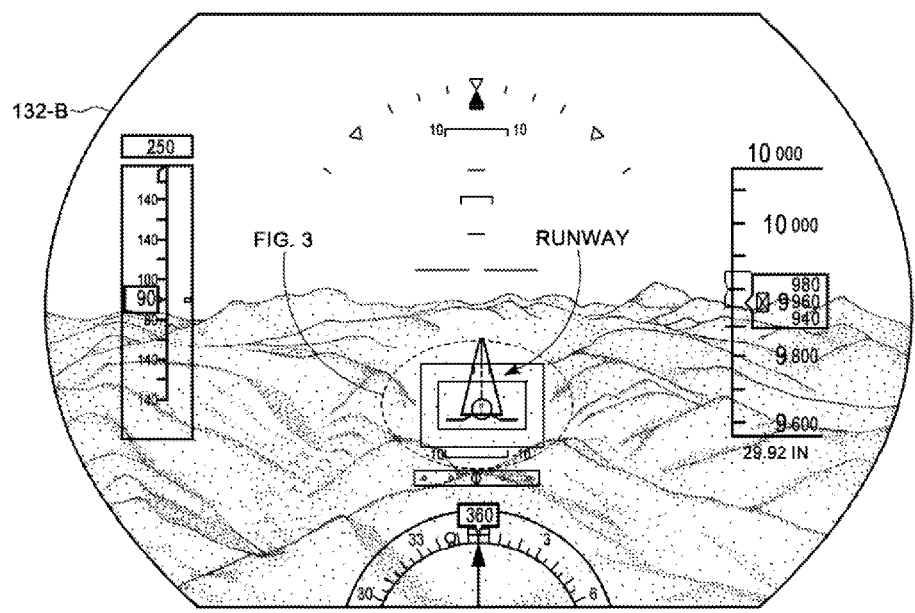
FIG. 2B presents an exemplary illustration of waypoint and flight path vector symbologies presented on a Head-Up Display unit.

Referring now to FIG. 2A, an exemplary depiction of a visual display unit 132-A comprised of an HDD has been configured to present tactical information to the pilot or flight crew against the background of a three-dimensional image of terrain and sky. FIG. 2B provides an exemplary depiction of a visual display unit 132-A comprised of a HUD unit for presenting tactical information to the pilot or flight crew against the background of the actual scene of ground and sky outside the aircraft and/or an image of the scene. Both the HDD unit and HUD unit could be employed as display units configured to present synthetic vision system (SVS) image(s), enhanced vision system (EVS) image(s), or combined SVS-EVS image(s). It should be noted that the tactical information depicted on the HDD unit and/or HUD unit has been made minimal for the sake of presentation and is not indicative of the plurality of indications or information with which it may be configured. Because the indications or information shown in FIGS. 2A and 2B are well-known to those skilled in the art, a discussion of the specific tactical information shown on them is not provided herein.

Figure 3:
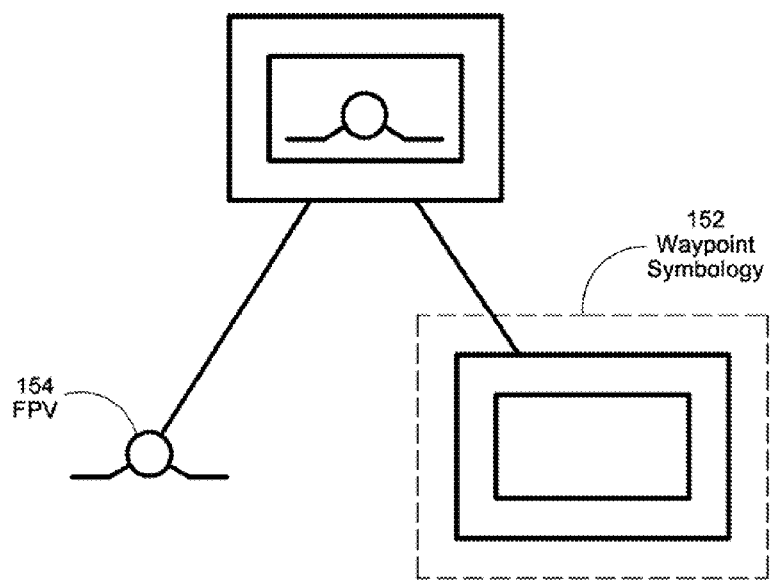
FIG. 3 illustrates waypoint and flight path vector symbologies.

Symbologies shown in FIGS. 2A and 2B that include waypoint and flight path vector (FPV) symbologies are shown separately in FIG. 3. As shown, waypoint symbology 152 is depicted as two rectangles, and FPV symbology 154 is depicted as an airplane with gull wings. Known to those skilled in the art, FPV symbology 154 could indicate where the aircraft is tracking. If a pilot wishes to fly to a waypoint, he or she may "steer" the aircraft until the FPV symbology 154 coincides with the waypoint symbology 152. As disclosed herein, the dimensions of the waypoint symbology 152 could correspond to factors related to RNP specifications including those factors from which the navigation data source 110 may monitor and provide an alert if the aircraft's position falls outside of a circle with a radius defined by the RNP. As discussed above, RNP may be a type of performance-based navigation known to those skilled in the art as discussed by Barber in U.S. Pat. No. 7,782,229 entitled "Required Navigation Performance (RNP) Scales for Indicating Permissible Flight Technical Error (FTE)," which is hereby incorporated by reference in its entirety.

Figure 4:
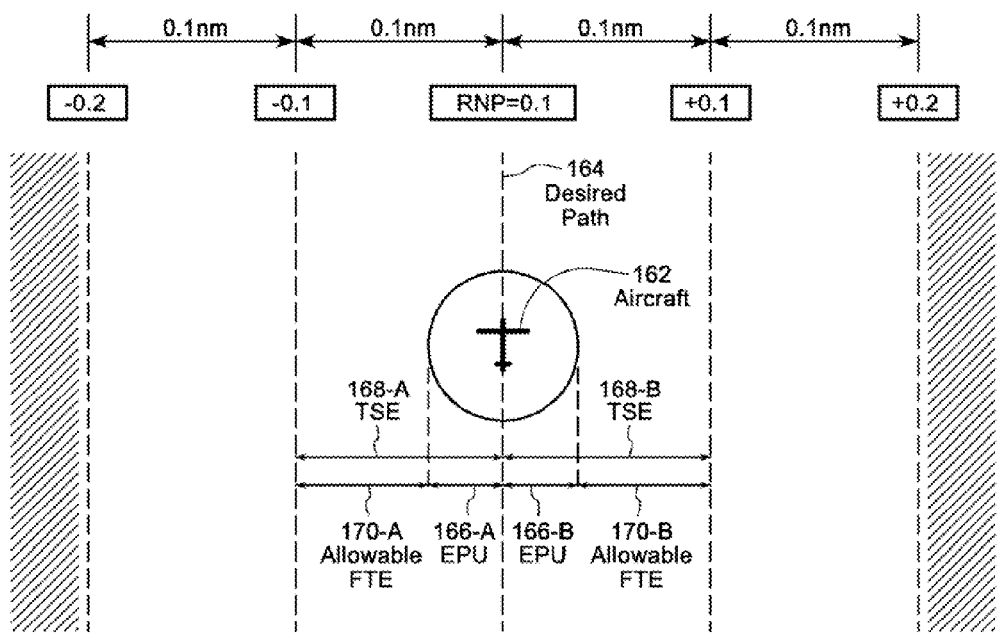
FIG. 4 illustrates a path in which positional information of an aircraft is depicted relative to a desired path and navigational boundaries.

Referring now to FIG. 4, an image of a path is shown in which positional information for an aircraft 162 is depicted relative to a desired path 164 such as may be provided via the navigation data source 110. The aircraft 164 is shown at a currently-estimated position along the desired path 164; however, as discussed above, factors corresponding to RNP may be present. An estimated position uncertainty (EPU) 166-A and EPU 166-B may be calculated by the source of navigation data 110. Because an aircraft's total system error (TSE) 168-A and TSE 168-B is expected to be within one RNP boundary equal to one times the RNP value ninety-five percent of the time, an allowable flight technical error (FTE) 170-A and FTE 170-B may be calculated as the difference between the TSE 168-A and TSE 168-B and the EPU 166-A and EPU 166-B, respectively; if TSE 168-A and TSE 168-B remains constant, EPU 166-A and EPU 166-B and FTE 170-A and FTE 170-B are inversely proportional to each other.

For the purpose of illustration and not of limitation, an RNP 0.1 is presented; as such, the first boundaries are located 0.1 nm from the desired path 164 on each side, and the second boundaries are located 0.2 nm from the desired path 164 on each side. If an RNP 4.0, then the first boundaries would be located 4.0 nm from the desired path 164 on each side, and the second boundaries would be located 8.0 nm from the desired path 164 on each side.

Some advantages and benefits of embodiments discussed herein are shown in FIGS. 5A through 6D by illustrating how RNP factors may be used to generate waypoint symbology and enhance situational awareness by informing the pilot of whether there is a presence or absence of allowable FTE. As discussed above, the allowable FTE may be determined as a difference between TSE (or RNP) and EPU.

Figure 5A:
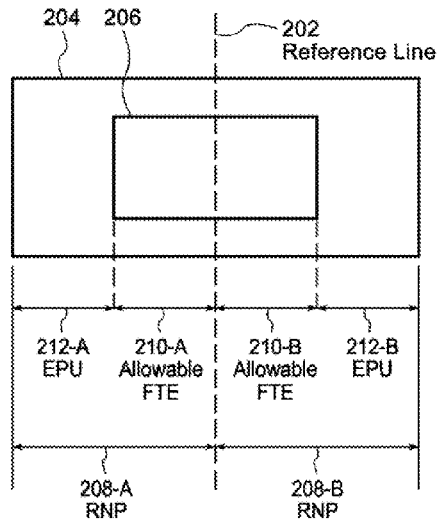
FIG. 5A illustrates two-dimensional waypoint symbology presenting two rectangles generated from a required navigation performance (RNP) value and an estimated position of uncertainty (EPU) value.

FIG. 5A illustrates waypoint symbology generated from data representative of the TSE 168-A and TSE 168-B and EPU 166-A and EPU 166-B of FIG. 4. As observed, the waypoint symbology may be an object that includes two shapes centered on a reference line 202: an outer rectangle 204 and an inner rectangle 206. The size and dimensions of both may be based upon RNP factors. For the outer rectangle 204, the length of a lateral side could be RNP 208-A and RNP 208-B measured laterally to the left and right of the reference line 202, respectively, where RNP 208-A and RNP 208-B each indicate the RNP or TSE value for the route. For the inner rectangle 206, the length of one lateral side could be an allowable FTE 210-A and an allowable FTE 210-B measured laterally to the left and right of the reference line 202, respectively, where the allowable FTE 210-A and the allowable FTE 210-B each indicate a difference between the RNP 208-A and the RNP 208-B and a calculated EPU 212-A and a calculated EPU 212-B, respectively.

Figure 5B:
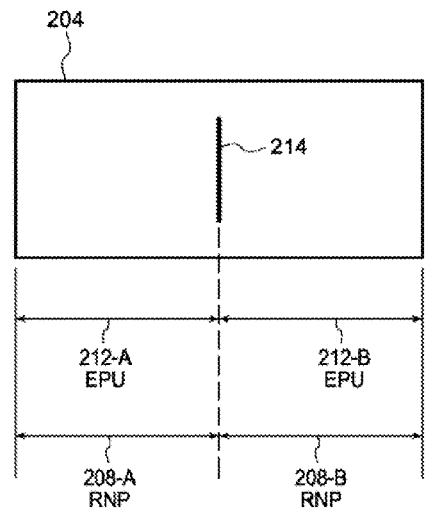
FIG. 5B illustrates two-dimensional waypoint symbology presenting two rectangles generated from the RNP and EPU values, showing the allowable flight technical error (FTE) is zero.

As discussed above, calculated EPU and allowable FTE are inversely proportional. When calculated EPU decreases, allowable FTE increases. This means that the lateral size of the inner rectangle 206 will increase with a decrease of calculated EPU; similarly, the lateral size of the inner rectangle 206 will decrease with an increase of calculated EPU. If an EPU is calculated as zero, then the left and right sides of the outer rectangle 204 and the inner rectangle 206 could coincide with each other. If the EPU is calculated to be greater than or equal to the TSE, then allowable FTE is zero which could mean an approach procedure may have to be abandoned. As shown in FIG. 5B, the inner rectangle 206 could become a line 214, indicative of an allowable FTE that is zero.

When presented to the pilot, the scale of the outer rectangle 204 (and the outer rectangles 244 and 264 discussed below) may be conformal to the outside scene in front of the aircraft and thus appear larger as the aircraft approaches the waypoint. The size may visually impart to the pilot a knowledge or an awareness of the width of the path at the waypoint, and the size of inner rectangle 206 (and the inner rectangle 266 discussed below) may visually impart a knowledge or an awareness of a level of steering precision that may be required to fly the aircraft towards the waypoint using the FPV symbology 154. A relatively large inner rectangle 206 may provide a bigger target to which the pilot may steer the FPV symbology 154, and a relatively small inner rectangle 206 may provide a smaller target to which the pilot may steer the FPV symbology 154. If an autopilot is being employed, the pilot could monitor the positional relationship between the waypoint symbology and the FPV symbology 154 and determine whether or not the autopilot system is performing adequately.

In some embodiments, the visual appearance of the outer rectangle 204 (and the outer rectangles 244 and 264 discussed below) and/or the inner rectangle 206 (and the inner rectangle 266 discussed below) could be altered in response to an allowable FTE approaching zero (a first level of threat). For example, the color of either or both could change to amber or yellow to indicate a caution alert, and/or either or both may begin to flash intermittently. As disclosed herein, the measurement of an allowable FTE at which the visual appearance changes or begins to change could be configurable by a manufacturer and/or end-user.

In some embodiments, the color could change to red to indicate a warning alert in response to an allowable FTE that is zero (a second level of threat), and/or either or both may begin to flash intermittently. The speed of the intermittent flashing could depend on whether a caution or warning alert is triggered; a relatively slow rate of flashing could be commensurate with a caution alert, and a relatively fast rate of flashing could be commensurate with a warning alert.

Figure 5C:
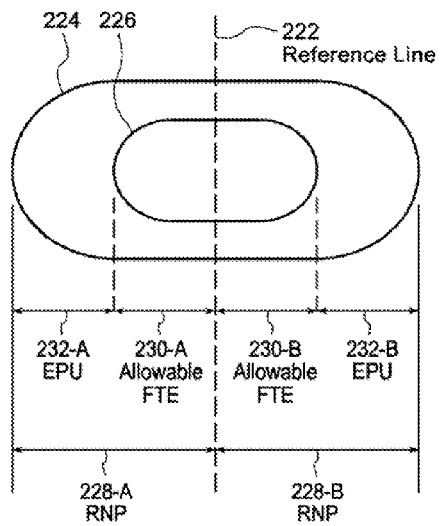
FIG. 5C illustrates two-dimensional waypoint symbology presenting two ellipses generated from the RNP and EPU values.

Referring now to FIG. 5C, waypoint symbology may not be limited to an object that includes two rectangles. As shown, two shapes centered on a reference line 222 include two ellipses: an outer ellipse 224 and an inner ellipse 226. Similar to the outer rectangle 204 and the inner rectangle 206 of FIG. 5A, the size and dimensions of the outer ellipse 224 and the inner ellipse 226 of FIG. 5C may be based upon RNP factors as discussed above. For the outer ellipse 224, the length of an axis could be RNP 228-A and RNP 228-B measured laterally to the left and right of the reference line 222, respectively, where RNP 228-A and RNP 228-B each indicate the RNP or TSE value for the route. For the inner ellipse 226, the length of an axis could be an allowable FTE 230-A and an allowable FTE 230-B measured laterally to the left and right of the reference line 222, respectively, where the allowable FTE 230-A and the allowable FTE 230-B each indicate a difference between the RNP 228-A and the RNP 228-B and a calculated EPU 232-A and a calculated EPU 232-B, respectively.

Figure 5D:
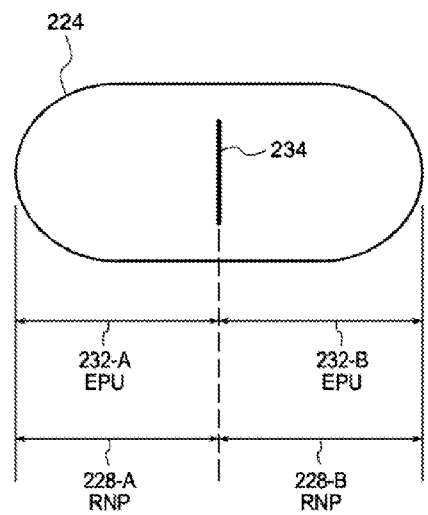
FIG. 5D illustrates two-dimensional waypoint symbology presenting two ellipses generated from the RNP and EPU values, showing allowable FTE is zero.

Similar to the inner rectangle 206 of FIG. 5A, the axis of the inner ellipse 226 of FIG. 5C will increase with a decrease of calculated EPU; similarly, the axis of the inner ellipse 226 will decrease with an increase of calculated EPU. If an EPU is calculated as zero, then the axes of the outer ellipse 224 and the inner ellipse 226 could coincide with each other. If the EPU is calculated to be greater than or equal to the TSE, then allowable FTE is zero. As shown in FIG. 5D, the length of the axis of inner ellipse 226 could be zero and represented by a line 234, indicative of an allowable FTE that is zero.

When presented to the pilot, the size of the outer ellipse 224 (and the outer ellipse 284 discussed below) may visually impart to him or her a knowledge or an awareness of the width of the path at the waypoint, and the size of inner ellipse 226 (and the inner ellipses 246 and 286 discussed below) may visually impart a knowledge or an awareness of a level of steering precision that may be required to fly the aircraft towards the waypoint using the FPV symbology 154. A relatively large inner ellipse 226 may provide a bigger target to which the pilot may steer the FPV symbology 154, and a relatively small inner ellipse 226 may provide a smaller target to which the pilot may steer the FPV symbology 154. As stated above, if an autopilot is being employed, the pilot could monitor the positional relationship between the waypoint symbology and the FPV symbology 154 and determine whether or not the autopilot system is performing adequately.

In some embodiments, the visual appearance of the outer ellipse 224 (and the outer ellipse 284 discussed below) and/or the inner ellipse 226 (and the inner ellipses 246 and 286 discussed below) could be altered in response to an allowable FTE approaching or reaching zero similarly to those of the outside rectangle 204 and inner rectangle 206 discussed above.

Figure 5E:
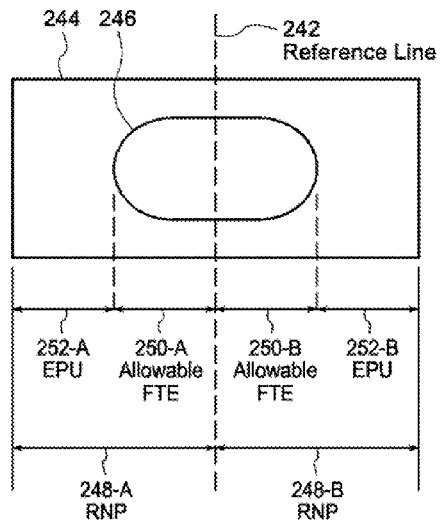
FIG. 5E illustrates two-dimensional waypoint symbology presenting one rectangle and one ellipse generated from the RNP and EPU values.

Referring now to FIG. 5E, waypoint symbology may not be limited to an object that includes two of the same shapes. As shown, two shapes centered on a reference line 242: an outer rectangle 244 and an inner ellipse 246. Similar to the outer rectangle 204 of FIG. 5A and the inner ellipse 226 of FIG. 5C, the size and dimensions of the outer rectangle 244 and the inner ellipse 246 of FIG. 5E may be based upon RNP factors as discussed above. For the outer rectangle 244, the length of a lateral side could be RNP 248-A and RNP 248-B measured laterally to the left and right of the reference line 242, respectively, where RNP 248-A and RNP 248-B each indicate the RNP or TSE value for the route. For the inner ellipse 246, the length of an axis could be an allowable FTE 250-A and an allowable FTE 250-B measured laterally to the left and right of the reference line 242, respectively, where the allowable FTE 250-A and the allowable FTE 250-B each indicate a difference between the RNP 248-A and the RNP 248-B and a calculated EPU 252-A and a calculated EPU 252-B, respectively.

Figure 5F:
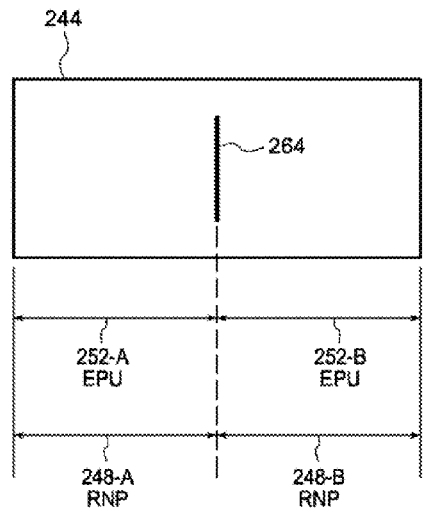
FIG. 5F illustrates two-dimensional waypoint symbology presenting one rectangle and one ellipse generated from the RNP and EPU values, showing allowable FTE is zero.

Similar to the inner ellipse 226 of FIG. 5C, the axis of the inner ellipse 246 of FIG. 5E will increase with a decrease of calculated EPU; similarly, the axis of the inner ellipse 246 will decrease with an increase of calculated EPU. If an EPU is calculated as zero, then the length of a lateral side of the outer rectangle 244 and the length of the axis of the inner ellipse 246 would be the same. If the EPU is calculated to be greater than or equal to the TSE, then allowable FTE is zero. As shown in FIG. 5F, the length of the axis of inner ellipse 246 could be zero and represented by a line 254, indicative of an allowable FTE that is zero.

It should be noted that, although the pervious discussion has been drawn towards waypoint symbology comprised of rectangles and/or ellipses, the disclosures presented herein are not limited to these specific shapes but could include any shape which visually conveys the same information to the pilot. In some embodiments, rectangular corners could be rounded off. In some embodiments, four quarter circles could be connected with lines to present to present a rectangle with rounded-off corners. In some embodiments, two half-circles could be connected with lines instead of an ellipse.

As shown, two shapes centered on a reference line 222 include two ellipses: an outer ellipse 224 and an inner ellipse 226. Similar to the outer rectangle 204 and the inner rectangle 206 of FIG. 5A, the size and dimensions of the outer ellipse 224 and the inner ellipse 226 of FIG. 5C may be based upon RNP factors as discussed above. For the outer ellipse 224, the length of an axis could be RNP 228-A and RNP 228-B measured laterally to the left and right of the reference line 222, respectively, where RNP 228-A and RNP 228-B each indicate the RNP or TSE value for the route. For the inner ellipse 226, the length of an axis could be an allowable FTE 230-A and an allowable FTE 230-B measured laterally to the left and right of the reference line 222, respectively, where the allowable FTE 230-A and the allowable FTE 230-B each indicate a difference between the RNP 228-A and the RNP 228-B and a calculated EPU 232-A and a calculated EPU 232-B, respectively.

Waypoint symbology may not be limited to a two-dimensional object. Waypoints may be depicted as three-dimensional objects as disclosed by Chiew et al in U.S. Pat. No. 7,965,202 entitled "System, System, [sic] Module, and Method for Presenting an Abbreviated Pathway on an Aircraft Display Unit," which is hereby incorporated by reference in its entirety.

Figure 6A:
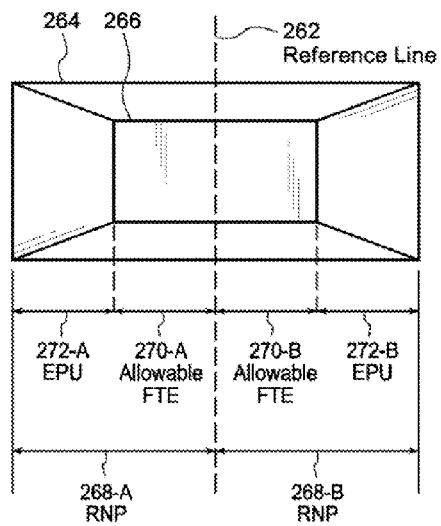
FIG. 6A illustrates three-dimensional waypoint symbology of a box presenting two rectangles generated from the RNP and EPU values.

Referring now to FIG. 6A, waypoint symbology may be a three-dimensional object resembling a box that includes two shapes centered on a reference line 262: an outer rectangle 264 which forms the edges of one distal face or side and an inner rectangle 266 which forms the edges of one proximal face or side. Similar to the outer rectangle 204 and the inner rectangle 206 of FIG. 5A, the size and dimensions of the outer rectangle 264 and the inner rectangle 266 of FIG. 6A may be based upon RNP factors. For the outer rectangle 264, the length of a lateral side could be RNP 268-A and RNP 268-B measured laterally to the left and right of the reference line 262, respectively, where RNP 268-A and RNP 268-B each indicate the RNP or TSE value for the route. For the inner rectangle 266, the length of one lateral side could be an allowable FTE 270-A and an allowable FTE 270-B measured laterally to the left and right of the reference line 262, respectively, where the allowable FTE 270-A and the allowable FTE 270-B each indicate a difference between the RNP 268-A and the RNP 268-B and a calculated EPU 272-A and a calculated EPU 272-B, respectively.

Figure 6B:
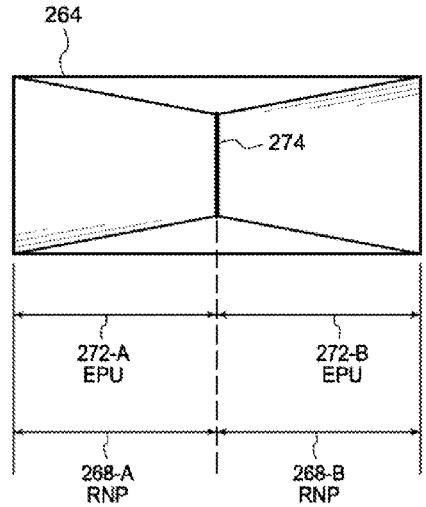
FIG. 6B illustrates three-dimensional waypoint symbology of a box presenting two rectangles generated from the RNP and EPU values, showing allowable FTE is zero.

Similar to the inner rectangle 206 of FIG. 5A, the lateral size of the inner rectangle 266 of FIG. 6A will increase with a decrease of calculated EPU; similarly, the lateral size of the inner rectangle 266 will decrease with an increase of calculated EPU. If an EPU is calculated as zero, then the left and right sides of the outer rectangle 264 and the inner rectangle 266 could coincide with each other. If the EPU is calculated to be greater than or equal to the TSE, then allowable FTE is zero. As shown in FIG. 6B, the inner rectangle 266 could become a line 274, indicative of an allowable FTE that is zero.

In some embodiments, the visual appearance of the outer rectangle 264, the inner rectangle 266, and/or the box could be altered in response to an allowable FTE approaching or reaching zero similarly to those of the outside rectangle 204 and inner rectangle 206 discussed above.

Figure 6C:
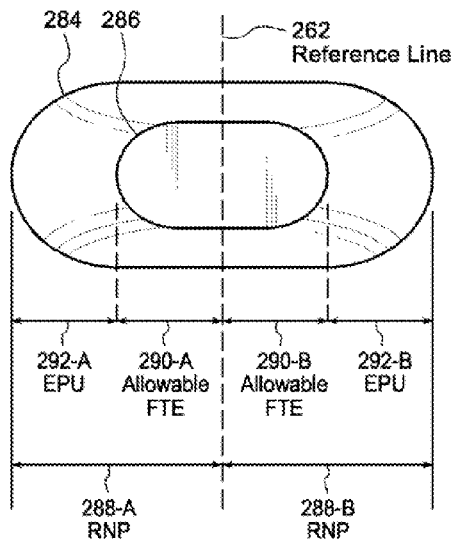
FIG. 6C illustrates three-dimensional waypoint symbology of an ellipsoid generated from the RNP and EPU values.

Referring now to FIG. 6C, waypoint symbology may not limited to a three-dimensional object resembling a box. As shown, the waypoint symbology may be a three-dimensional object resembling an ellipsoid that includes two shapes centered on a reference line 282: an outer ellipse 284 and an inner ellipse 286. Similar to the outer ellipse 224 and the inner ellipse 226 of FIG. 5C, the size and dimensions of the outer ellipse 284 and the inner ellipse 286 of FIG. 6C may be based upon RNP factors as discussed above. For the outer ellipse 284, the length of an axis could be RNP 288-A and RNP 288-B measured laterally to the left and right of the reference line 282, respectively, where RNP 288-A and RNP 288-B each indicate the RNP or TSE value for the route. For the inner ellipse 286, the length of an axis could be an allowable FTE 290-A and an allowable FTE 290-B measured laterally to the left and right of the reference line 282, respectively, where the allowable FTE 290-A and the allowable FTE 290-B each indicate a difference between the RNP 288-A and the RNP 288-B and a calculated EPU 292-A and a calculated EPU 292-B, respectively.

Figure 6D:
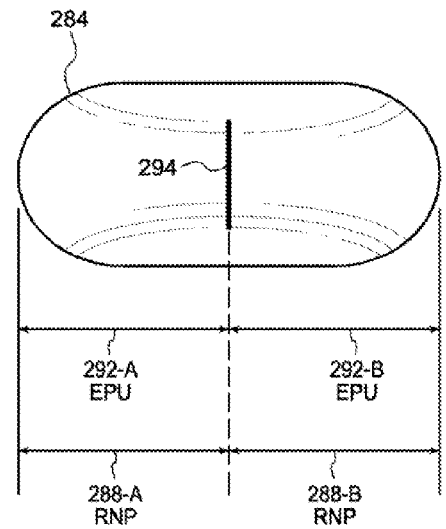
FIG. 6D illustrates three-dimensional waypoint symbology of an ellipsoid presenting two ellipses generated from the RNP and EPU values, showing allowable FTE is zero.

Similar to the inner ellipse 226 of FIG. 5C, the axis of the inner ellipse 286 of FIG. 6C will increase with a decrease of calculated EPU; similarly, the axis of the inner ellipse 286 will decrease with an increase of calculated EPU. If an EPU is calculated as zero, then the axes of the outer ellipse 284 and the inner ellipse 286 could coincide with each other. If the EPU is calculated to be greater than or equal to the TSE, then allowable FTE is zero. As shown in FIG. 6D, the length of the axis of inner ellipse 276 could be zero and represented by a line 294, indicative of an allowable FTE that is zero.

In some embodiments, the visual appearance of the outer ellipse 284, the inner ellipse 286, and/or the ellipsoid could be altered in response to an allowable FTE approaching or reaching zero similarly to those of the outside rectangle 204 and inner rectangle 206 discussed above.

It should be noted that, although the disclosures presented herein will be drawn to lateral RNP values, they may be applied apply to vertical RNP values which could provide vertical guidance. Lateral and vertical RNP standards may appear in an Advisory Circular ("AC") published by the Federal Aviation Administration ("FAA") and in a Document ("DO") published by the Radio Technical Commission for Aeronautics ("RTCA"). For example, the FAA has published AC 120-29A entitled "Criteria for Approval of Category I and Category II Weather Minima for Approach," and the RCTA has published DO-236B entitled "Minimum Aviation System Performance Standards: Required Navigation Performance for Area Navigation," each of which is incorporated herein in its entirety.

It should be further noted that, although the disclosures presented herein will be drawn to waypoint symbology generated to produce a fixed outer shape and a variably-sized inner shape, they are not limited to these. Instead, waypoint symbology could be generated to produce a fixed inner shape and a variably-sized outer shape where applicable.

For example, a required FTE may be specified for a Special Authorization Category One (SA CAT I) and Category Two (CAT II) I Instrument Landing System (ILS) Approaches, where a decision height is less than 200 ft. In this case, AC 120-29A specifies maximum lateral and vertical deviations, where the latter may be found from angular deviations and the geometry of the approach. The distance from an outer edge of a fixed inner shape of the waypoint symbology (corresponding to the required FTE) to the edge of the outer shape box which could be an assessment of the current ninety-five percent navigation system error (NSE). In this case, the dimension of the outer shape representing TSE could change, resulting in a variably-sized outer shape.

Figure 7:
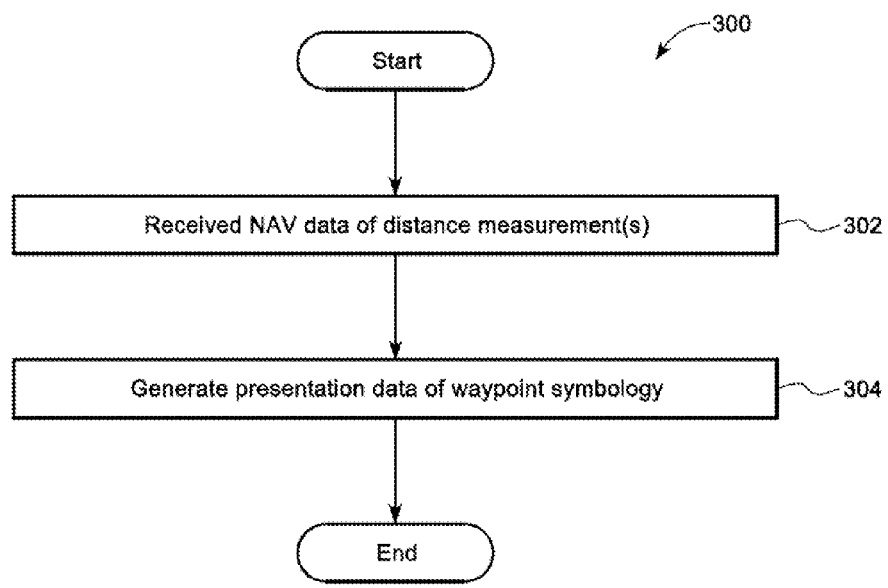
FIG. 7 illustrates a flowchart disclosing an embodiment of a method for generating waypoint symbology.

FIG. 7 depicts flowchart 300 disclosing an example of a method for generating waypoint symbology, where the SG 120 may be programmed or configured with instructions corresponding to the modules embodied in flowchart 300. In some embodiments, the SG 120 may be a processor or a combination of processors found in the presentation system 130 or any other system suitable for performing the task. Also, the SG 120 may be a processor of a module such as, but not limited to, a printed circuit card having one or more input interfaces to facilitate the two-way data communications of the SG 120, i.e., the receiving and providing of data. As necessary for the accomplishment of the following modules embodied in flowchart 300, the acquiring of data is synonymous and/or interchangeable with the receiving and/or retrieving of data, and the providing of data is synonymous and/or interchangeable with the making available or supplying of data.

The method of flowchart 300 begins with module 302 with the SG 120 acquiring navigation data representative of one or more distance measurements of an RNAV system or a RNP system from the navigation data source 110. In some embodiments, one distance measurements could be an EPU, and/or one distance measurement could be allowable FTE.

The flowchart 300 continues with module 304 with the SG 120 generating presentation data as a function of the navigation data. The symbology data may be representative of waypoint symbology presentable to a viewer. In some embodiments, the waypoint symbology could be a two-dimensional object or a three-dimensional object comprised of at least one shape, where each shape of the plurality of shapes may be scaled to one navigation measurement as discussed in detail. In some embodiments, each shape of the plurality of shapes may be the same shape of different size. In some embodiments, the visual appearance of one or more shapes may be altered in response to a value of a navigation measurement. Then, the method of flowchart 300 ends.

It should be noted that the method steps described above may be embodied in computer-readable media stored in a non-transitory computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the inventive concepts disclosed herein. It is intended that all modifications, permutations, enhancements, equivalents, and improvements thereto that are apparent to those skilled in the art upon a reading of the specification and a study of the drawings are included within the true spirit and scope of the inventive concepts disclosed herein. It is therefore intended that the following appended claims include all such modifications, permutations, enhancements, equivalents, and improvements falling within the true spirit and scope of the inventive concepts disclosed herein.

What is claimed is:

1. A system for generating waypoint symbology, comprising:
a source of navigation data representative of
a first measurement comprised of a required navigation performance or a total system error, and
a second measurement comprised of at least one of an allowable flight technical error and an estimated position uncertainty; and
a symbology generator including at least one processor coupled to a non-transitory processor-readable medium storing processor-executable code and configured to:
acquire the navigation data;
generate presentation data representative of waypoint symbology as a function of the first measurement and the second measurement, where
the waypoint symbology is comprised of an object defined by a plurality of concentric shapes centered on a reference line, where
a size of a first concentric shape is scaled to the first measurement, and
a size of a second concentric shape is scaled to the second measurement; and
provide the presentation data to a presentation system, whereby
the waypoint symbology is presented to a viewer of at least one aircraft display unit.

2. The system of claim 1, wherein the object is a two-dimensional object.

3. The system of claim 2, wherein
the first concentric shape and the second concentric shape are both rectangles,
the first concentric shape and the second concentric shape are both ellipses, or
the first concentric shape is a rectangle and the second concentric shape is an ellipse.

4. The system of claim 1, wherein
the size of the second concentric shape increases with an increase of the allowable flight technical error, and
the size of the second concentric shape decreases with a decrease of the allowable flight technical error.

5. The system of claim 1, wherein the object is a three-dimensional object.

6. The system of claim 5, wherein
the first concentric shape and the second concentric shape are both rectangles, or
the first concentric shape and the second concentric shape are both ellipses.

7. The system of claim 1, wherein
the size of the second concentric shape increases with a decrease of the estimated position uncertainty, and
the size of the second concentric shape decreases with an increase of the estimated position uncertainty.

8. The system of claim 1, wherein a visual appearance of the waypoint symbology is alterable in response to at least one level of threat.

9. A device for generating waypoint symbology, comprising:
a symbology generator including at least one processor coupled to a non-transitory processor-readable medium storing processor-executable code and configured to:
acquire navigation data representative of
a first measurement comprised of a required navigation performance or a total system error, and
a second measurement comprised of at least one of an allowable flight technical error and an estimated position uncertainty;
generate presentation data representative of waypoint symbology as a function of the first measurement and the second measurement, where
the waypoint symbology is comprised of an object defined by a plurality of concentric shapes centered on a reference line, where
a size of a first concentric shape is scaled to the first measurement, and
a size of a second concentric shape is scaled to the second measurement; and
provide the presentation data to a presentation system, whereby
the waypoint symbology is presented to a viewer of at least one aircraft display unit.

10. The device of claim 9, wherein the object is a two-dimensional object.

11. The device of claim 9, wherein
the size of the second concentric shape increases with an increase of the allowable flight technical error, and
the size of the second concentric shape decreases with a decrease of the allowable flight technical error.

12. The device of claim 9, wherein the object is a three-dimensional object.

13. The device of claim 9, wherein
the size of the second concentric shape increases with a decrease of the estimated position uncertainty, and
the size of the second concentric shape decreases with an increase of the estimated position uncertainty.

14. The device of claim 9, wherein a visual appearance of the waypoint symbology is alterable in response to at least one level of threat.

15. A method for generating waypoint symbology, comprising:
acquiring, by at least one processor coupled to a non-transitory processor-readable medium storing processor-executable code, navigation data representative of
a first measurement comprised of a required navigation performance or a total system error, and
a second measurement comprised of at least one of an allowable flight technical error and an estimated position uncertainty;
generating presentation data representative of waypoint symbology as a function of the first measurement and the second measurement, where
the waypoint symbology is comprised of an object defined by a plurality of concentric shapes centered on a reference line, where
a size of a first concentric shape is scaled to the first measurement, and
a size of a second concentric shape is scaled to the second measurement; and
providing the presentation data to a presentation system, whereby
the waypoint symbology is presented to a viewer of at least one aircraft display unit.

16. The method of claim 15, wherein the object is a two-dimensional object.

17. The method of claim 15, wherein
the size of the second concentric shape increases with an increase of the allowable flight technical error, and
the size of the second concentric shape decreases with a decrease of the allowable flight technical error.

18. The method of claim 15, wherein the object is a three-dimensional object.

19. The method of claim 15, wherein
the size of the second concentric shape increases with a decrease of the estimated position uncertainty, and
the size of the second concentric shape decreases with an increase of the estimated position uncertainty.

20. The method of claim 15, wherein a visual appearance of the waypoint symbology is alterable in response to at least one level of threat.

\* \* \* \* \*